(12) United States Patent
Nishi et al.

(10) Patent No.: US 11,199,659 B2
(45) Date of Patent: Dec. 14, 2021

(54) OPTICAL MODULE

(71) Applicant: Nippon Telegraph and Telephone Corporation, Tokyo (JP)

(72) Inventors: Hidetaka Nishi, Tokyo (JP); Shuichiro Asakawa, Tokyo (JP); Kota Shikama, Tokyo (JP); Yusuke Muranaka, Tokyo (JP); Ai Yanagihara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,873

(22) PCT Filed: May 17, 2019

(86) PCT No.: PCT/JP2019/019737
§ 371 (c)(1),
(2) Date: Dec. 3, 2020

(87) PCT Pub. No.: WO2019/235183
PCT Pub. Date: Dec. 12, 2019

(65) Prior Publication Data
US 2021/0231871 A1 Jul. 29, 2021

(30) Foreign Application Priority Data
Jun. 6, 2018 (JP) .............................. JP2018-108302

(51) Int. Cl.
*G02B 6/26* (2006.01)
(52) U.S. Cl.
CPC ..................................... *G02B 6/26* (2013.01)

(58) Field of Classification Search
None
See application file for complete search history.

(56) References Cited

U.S. PATENT DOCUMENTS

| | | | | |
|---|---|---|---|---|
| 9,599,781 | B1* | 3/2017 | Skogen | ............... G02B 6/1226 |
| 2005/0249451 | A1* | 11/2005 | Baehr-Jones | .......... B82Y 20/00 |
| | | | | 385/14 |
| 2012/0251030 | A1* | 10/2012 | Delacour | ............. G02B 6/1226 |
| | | | | 385/2 |

OTHER PUBLICATIONS

Noriki et al., "Mirror-based surface optical input/outputtechnology with precise and arbitrary coupling angle for silicon photonic application," Japanese Journal of Applied Physics, vol. 56, Feb. 23, 2017, 5 pages.

(Continued)

*Primary Examiner* — Chad H Smith
(74) *Attorney, Agent, or Firm* — Slater Matsil, LLP

(57) ABSTRACT

An optical module according to the present invention includes: a first plasmonic waveguide having one end formed of a first metal layer formed over an end portion of a first substrate, and having another end connected to one end of a first optical waveguide; a second metal layer that is formed on a side surface continuous with the end portion of the first substrate and formed to be continuous with the first metal layer; a second substrate provided with a second plasmonic waveguide formed of a third metal layer; and a second optical waveguide that is connected to the second plasmonic waveguide and formed on the second substrate, wherein the second metal layer and a part of the third metal layer are joined together to connect the first substrate to the second substrate.

10 Claims, 3 Drawing Sheets

(56) References Cited

OTHER PUBLICATIONS

Ura et al., "Vertical Integration of Optical Waveguides and Interconnection by a Pair of Integrated Grating Couplers," Journal of the Japan Electronics Packaging Institute, vol. 6, No. 4, 2001, pp. 489-496.

* cited by examiner

OPTICAL MODULE

CROSS-REFERENCE TO RELATED APPLICATIONS

This application is a national phase entry of PCT Application No. PCT/JP2019/019737, filed on May 17, 2019, which claims priority to Japanese Application No. 2018-108302, filed on Jun. 6, 2018, which applications are hereby incorporated herein by reference.

TECHNICAL FIELD

The present invention relates to an optical module having a configuration in which optical waveguides formed on different substrates, respectively, are connected by integrating the substrates.

BACKGROUND

To achieve small, densely-integrated, and sophisticated optical integrated circuits, a three-dimensional optical circuit configuration has attracted attention. Thus, a three-dimensional optical packaging technique for optically connecting different optical waveguide chips is important. In a case where chips (substrates) on which optical waveguides are formed, respectively, are three-dimensionally combined, optical waveguides 202 formed on two substrates 201, respectively, are optically connected through respective polarization elements 203 as illustrated in FIG. 4.

The polarization elements 203 are provided at input and output ends of the optical waveguides 202 formed on the substrates 201, respectively. Light propagating in a light propagation direction through the optical waveguide 202 on one of the substrates 201 is bent by 90 degrees by the polarization element 203, and is then caused to penetrate through the one of the substrates 201 and is optically coupled with the polarization element 203 on the other one of the substrates 201. The light optically coupled with the polarization element 203 on the other one of the substrates 201 is bent by 90 degrees in the light propagation direction and propagates through the optical waveguide 202 on the other one of the substrates 201. As polarization elements, a grating coupler (Non-Patent Literature 1), a mirror (Non-Patent Literature 2), and the like are proposed.

CITATION LIST

Non-Patent Literature

Non-Patent Literature 1: Ura Shogo et al., "Vertical Integration of Optical Waveguides and Interconnection by a Pair of Integrated Grating Couplers", Journal of The Japan Institute of Electronics Packaging, No. 4, vol. 6, pp. 489 to 496, 2001.
Non-Patent Literature 2: Akihiro Noriki et al., "Mirror-based surface optical input/output technology with precise and arbitrary coupling angle for silicon photonic application", Japanese Journal of Applied Physics, vol. 56, 04CH04, 2017.

SUMMARY

Technical Problem

However, first, fabrication of a grating coupler requires preparation of a fine structure with a periodic sub-wavelength level by a lithography technique, and hence is difficult. In addition, the grating coupler has a serious problem that an operating wavelength is limited. On the other hand, in the case of using a mirror, a large three-dimensional mirror structure is prepared on the back surface or front surface of an optical waveguide chip. Preparation of such a structure is not generally included in optical waveguide preparation processes. Accordingly, an extremely special production process is required, which causes a serious problem in productivity. In addition, in the case of using these polarization elements, optical coupling is made between surfaces of optical waveguide chips (substrates), which makes it difficult to package a plurality of different optical waveguide chips with high density.

Embodiments of the present invention have been made to solve the above-described problems, and an object of embodiments of the present invention is to facilitate an optical connection between optical waveguides respectively provided on different substrates three-dimensionally arranged, without limiting an operating wavelength.

Means for Solving the Problem

An optical module according to embodiments of the present invention includes: a first substrate provided with a first optical waveguide; a first plasmonic waveguide having one end formed of a first metal layer formed over an end portion of the first substrate, and having another end connected to one end of the first optical waveguide; a second metal layer that is formed on a side surface continuous with the end portion of the first substrate and formed to be continuous with the first metal layer; a second substrate provided with a second plasmonic waveguide formed of a third metal layer; and a second optical waveguide that is connected to the second plasmonic waveguide and formed on the second substrate, wherein the second metal layer and a part of the third metal layer are joined together to connect the first substrate to the second substrate, and a waveguide direction at one end of the first plasmonic waveguide located on a side of the end portion coincides with a waveguide direction of the second plasmonic waveguide.

In the above-described optical module, the first plasmonic waveguide and the first optical waveguide are connected by a mode conversion portion provided on the first substrate, and in the mode conversion portion, one end of a core of the first optical waveguide is tapered, and the first metal layer at another end of the first plasmonic waveguide and the one end of the core of the first optical waveguide are arranged at a predetermined interval.

In the above-described optical module, the third metal layer is tapered with a width equal to a width of a core of the second optical waveguide in a connection portion with the second optical waveguide.

In the above-described optical module, a surface of the first substrate is vertical to a surface of the second substrate.

In the above-described optical module, the second substrate is provided with a plurality of pairs of the second plasmonic waveguide and the second optical waveguide, a number of the first substrates corresponding to the number of pairs of the second plasmonic waveguide and the second optical waveguide are provided, and the first substrates are respectively connected to the plurality of pairs of the second plasmonic waveguide and the second optical waveguide.

Effects of Embodiments of the Invention

As described above, according to embodiments of the present invention, the first optical waveguide and the second optical waveguide are optically connected through the first plasmonic waveguide and the second plasmonic waveguide, thereby obtaining an advantageous effect of facilitating an optical connection between optical waveguides respectively provided on different substrates three-dimensionally arranged, without limiting an operating wavelength.

DETAILED DESCRIPTION OF ILLUSTRATIVE EMBODIMENTS

Figure 1A:
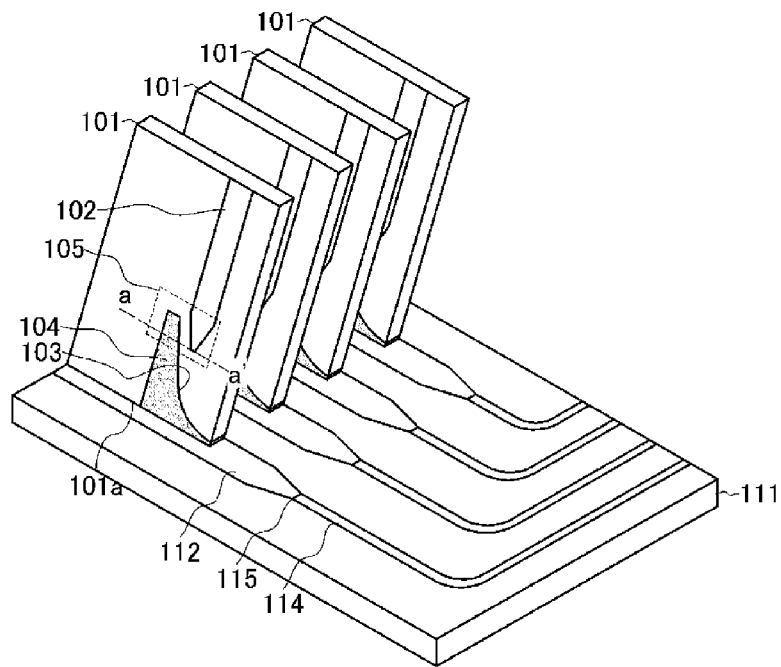
FIG. 1A is a perspective view illustrating a configuration of an optical module according to an embodiment of the present invention.
Figure 1B:
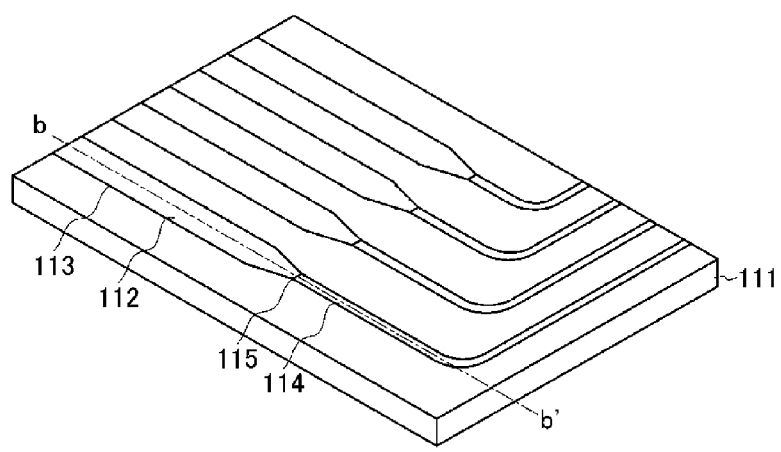
FIG. 1B is a perspective view illustrating a configuration of a part of the optical module according to the embodiment of the present invention.
Figure 2A:
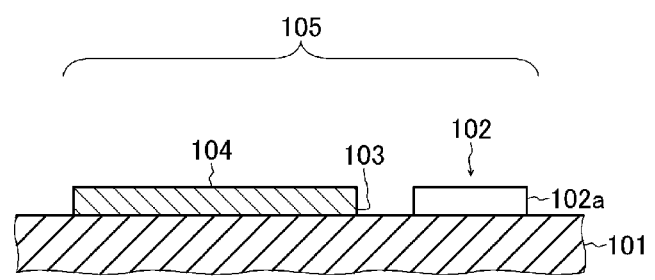
FIG. 2A is a sectional view illustrating a configuration of a part of the optical module according to the embodiment of the present invention.
Figure 2B:
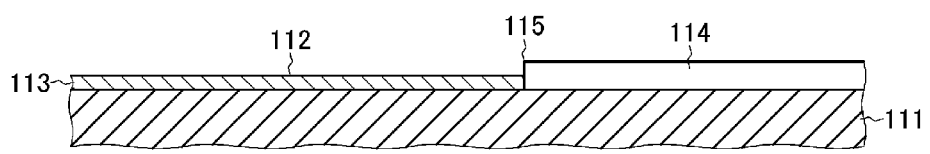
FIG. 2B is a sectional view illustrating a configuration of a part of the optical module according to the embodiment of the present invention.

An optical module according to an embodiment of the present invention will be described below with reference to FIGS. 1A, 1B, 2A, and B. Note that FIG. 2A illustrates a section taken along a line a-a' in FIG. 1A. FIG. 2B illustrates a section taken along a line b-b' in FIG. 1B.

This optical module has a configuration in which first substrates 101 and a second substrate 11 are three-dimensionally connected and integrated. In this example, a surface of the first substrate 101 is vertical to a surface of the second substrate 111, and a plurality of first substrates 101 is connected to a single second substrate 111.

On each of the first substrates 101, a first optical waveguide 102 and a first plasmonic waveguide 103 are formed. The first plasmonic waveguide 103 is formed of a first metal layer 104 having one end formed over an end portion 101a of the first substrate 101. Further, the first plasmonic waveguide 103 has another end that is optically connected to one end of the first optical waveguide 102. Note that a second metal layer (not illustrated) is formed on a side surface that is continuous with the end portion 101a of the first substrate 101. The second metal layer is formed to be continuous with the first metal layer 104.

For example, the first plasmonic waveguide 103 and the first optical waveguide 102 are connected by a mode conversion portion 105 that is provided on the first substrate 101. In the mode conversion portion 105, one end of a core of the first optical waveguide 102 is tapered, and the first metal layer 104 and a core 102a of the first optical waveguide 102 are arranged at a predetermined interval as illustrated in FIG. 2A at one end of each of the first optical waveguide 102 and the first metal layer 104 located at the other end of the first plasmonic waveguide 103. In the entire area of the mode conversion portion 105, the interval between the first metal layer 104 and the core 102a of the first optical waveguide 102 is constant.

The dimensions of a section of the core 102a, which is made of silicon, in a main portion of the first optical waveguide 102 may be, for example, 200 nm×400 nm. A lower clad of the first optical waveguide 102 may be formed of a silicon oxide layer with a thickness of 3 m. The first metal layer 104 may be formed of Au and may have a thickness of about 200 nm. The interval between the first metal layer 104 and the core 102a of the first optical waveguide 102 in the mode conversion portion 105 may be about 100 nm. The length (tapered length) of the core 102a in the tapered area in the mode conversion portion 105 may be about 1 μm. These dimensions are appropriately adjusted so as to reduce the amount of loss and reflection in the mode conversion portion 105. These structures can be easily formed by a general Si optical waveguide device preparation process.

In this case, the first optical waveguide 102 has a configuration in which the first substrate 101 is formed as the lower clad, an air layer above the lower clad is formed as an upper clad, and the core 102a is sandwiched between these clads. The first substrate 101 is formed of, for example, silicon oxide, and the core 102a is formed of, for example, silicon. The first plasmonic waveguide 103 is formed on a side surface of the first metal layer 104 that faces the core 102a.

In the mode conversion portion 105, guided light outgoing from the tapered core 102a induces a surface plasmon polariton on the surface of the side surface of the first metal layer 104 that forms the first plasmonic waveguide 103. The surface plasmon polariton induced as described above is guided through the first plasmonic waveguide 103. The surface plasmon polariton is one type of elementary excitation in which surface plasmon induced on the surface of a material having free electrons is coupled with light irradiated on the material.

On the first substrate 101, the polarization (TE polarization) in which the direction of an electric field oscillation propagating through the first optical waveguide 102 is parallel to the flat surface of the first optical waveguide 102 is converted into light (surface plasmon polariton) propagating through the first plasmonic waveguide 103 in the mode conversion portion 105.

On the other hand, the light of surface plasmon polariton guided through the first plasmonic waveguide 103 is optically coupled to the first optical waveguide 102 by the core 102a in the mode conversion portion 105, and is guided to the first optical waveguide 102. In a location (mode conversion portion 105) where the one end of the first optical waveguide 102 and the other end of the first plasmonic waveguide 103 are optically connected, light is caused to propagate through the both waveguides.

Further, on the second substrate 111, a second plasmonic waveguide 112, which is formed of a third metal layer 113, and a second optical waveguide 114 are formed. The second optical waveguide 114 contacts the second plasmonic waveguide 112 at a connection portion 115 and is optically connected to the second plasmonic waveguide 112. For example, the end portion 101a is arranged on a central axis in the waveguide direction of the second plasmonic waveguide 112. The third metal layer 113 is tapered to have the same width as that of the core of the second optical waveguide 114 at the connection portion 115 with the second optical waveguide 114.

For example, in consideration of the arrangement accuracy in assembling the first substrate 101 and the second substrate 111, the third metal layer 113 may be formed with a width of about 2 μm. The third metal layer 113 may be formed of Au and have a thickness of about 20 nm. The second optical waveguide 114 is, for example, an optical waveguide having a configuration in which a core is made of Si and having sectional dimensions of 200 nm×400 nm and the second substrate 111 is formed as the lower clad. The angular dimensions and arrangement relationship are appropriately adjusted so as to reduce the amount of mode conversion loss and reflection between the propagation mode of the second plasmonic waveguide 112 and the propagation mode of the second optical waveguide 114. For example, the width of the Si core of the second optical waveguide 114 may be narrowed at the boundary (connection portion 115) with the second plasmonic waveguide 112, and then may be widened into a tapered shape or the like.

In this case, the second metal layer and a part of the third metal layer 113 are joined together to connect the first substrate 101 to the second substrate 111. In this case, the second metal layer and a part of the third metal layer 113 are joined together by metal-metal joining without using an adhesive or the like. For example, the second metal layer and a part of the third metal layer may be joined together by an Au—Au direct joining technique using surface activation joining or the like. Further, the waveguide direction at one end of the first plasmonic waveguide 103 located on the side of the end portion 101a coincides with the waveguide direction of the second plasmonic waveguide 112. In this example, the first plasmonic waveguide 103 is bent by 90° with a radius of 2 μm in the waveguide direction on the surface of the first substrate 101, and is connected to the plasmonic waveguide using the second metal layer formed on the side surface, which is continuous with the end portion 101a of the first substrate 101, as a propagation path. Note that in the path through which light propagates through the second metal layer, the electric field of propagating light is present on the first substrate 101.

The surface plasmon polariton guided through the first plasmonic waveguide 103 formed on the first metal layer 104 that is continuous with the second metal layer passes through the plasmonic waveguide using the second metal layer as a propagation path, and propagates to the second plasmonic waveguide 112 that is formed on the surface of the third metal layer 113 connected with the second metal layer by metal-metal joining as described above. As described above, by metal-metal joining between the second metal layer and the third metal layer 113, the first plasmonic waveguide 103 and the second plasmonic waveguide 112 form an integrated plasmonic waveguide. Light (surface plasmon polariton) guided through the second plasmonic waveguide 112 (surface of the third metal layer 113) is optically coupled with the second optical waveguide 114 at the connection portion 115, and is guided through the second optical waveguide 114.

Note that in this example, a plurality of pairs of the second plasmonic waveguide 112 and the second optical waveguide 114 is provided on the second substrate 111. A number of first substrates 101 corresponding to the number of pairs of the second plasmonic waveguide 112 and the second optical waveguide 114 are provided, and each of the first substrates 101 is connected to each of the plurality of pairs of the second plasmonic waveguide 112 and the second optical waveguide 114.

Incidentally, in the example described above, the polarization direction of light propagating through the second optical waveguide 114 on the second substrate 111 corresponds to the polarization (TM polarization) in which the electric field oscillation direction is vertical to the surface of the second substrate 111. To control the polarization state, a polarization rotation element may be provided, as needed, on the second substrate 111.

Figure 3:
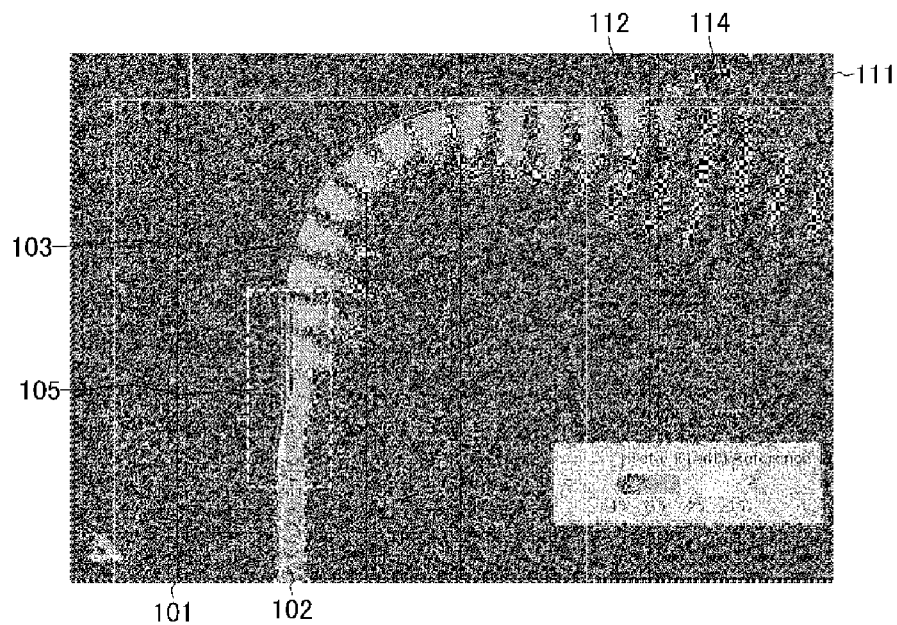
FIG. 3 is a distribution chart illustrating results of calculating a state of light propagation from a first optical waveguide 102 to a second optical waveguide 114 by a two-dimensional finite-difference time-domain method.
Figure 4:
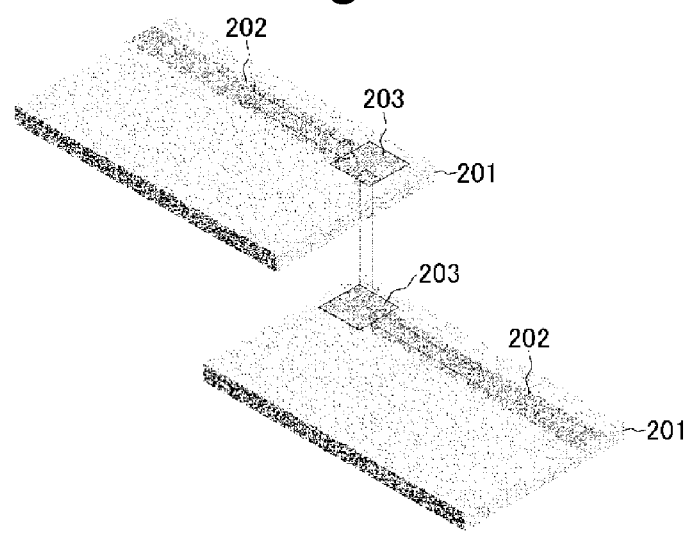
FIG. 4 is a perspective view illustrating a configuration in which optical waveguides 202 provided on two substrates 201, respectively, are connected together.

FIG. 3 illustrates a state of light propagation from the first optical waveguide 102 to the second optical waveguide 114 as a result of calculating the state by a two-dimensional finite-difference time-domain (FDTD) method. It is obvious that optical coupling is made between the first substrate 101 and the second substrate 111 by using the first plasmonic waveguide 103 and the second plasmonic waveguide 112 as interfaces.

As described above, according to embodiments of the present invention, the configuration in which the first optical waveguide and the second optical waveguide are optically connected through the first plasmonic waveguide and the second plasmonic waveguide facilitates an optical connection between optical waveguides respectively provided on different substrates three-dimensionally arranged, without limiting the operating wavelength.

Further, the central position of the second metal layer that is formed on the side surface of the first substrate need not completely match the central position of the third metal layer, and the above-described optical coupling can be obtained as long as the continuity on the surface of the metal layer forming each plasmonic waveguide is maintained. Consequently, the advantageous effect of eliminating the need for the highly accurate optical alignment required in the related art can also be obtained.

Further, according to embodiments of the present invention, a plurality of first substrates can be arranged on the second substrate. With this configuration, if there is a need to match the wavelength and polarization characteristics of a plurality of elements provided on the first substrate with the wavelength and polarization characteristics of a plurality of elements provided on the second substrate, appropriate elements can be selected and mounted. For example, the first substrates each including a semiconductor laser having a plurality of oscillation wavelengths as wavelength multiplexing light sources are prepared to preliminarily recognize a deviation in oscillation wavelength due to a production error or the like, and a first substrate group having an appropriate oscillation wavelength is selected, and the selected first substrate group is mounted on the second substrate on which a wavelength filter that combines different wavelengths is prepared. With this configuration, wavelength multiplexing light sources each including a desired oscillation wavelength group can be formed with high density. Note that the wavelength multiplexing light sources prepared on the first substrates, respectively, are described by way of example. For example, a wavelength filter or modulator having a wavelength dependence may be formed on each of the first substrates.

Note that the present invention is not limited to the embodiments described above, and it is obvious that a number of modifications and combinations can be carried out by a person having an ordinary knowledge in this technical field within the technical idea of the present invention.

REFERENCE SIGNS LIST 101 first substrate
101a end portion
102 first optical waveguide
103 first plasmonic waveguide
104 first metal layer
105 mode conversion portion 111 second substrate
112 second plasmonic waveguide
113 third metal layer
114 second optical waveguide
115 connection portion.

The invention claimed is:

1. An optical module comprising:
   a first substrate having a first optical waveguide;
   a first plasmonic waveguide comprising:
     a first end formed of a first metal layer and disposed over an end portion of the first substrate; and
     a second end connected to a first end of the first optical waveguide;
   a second metal layer on a side surface continuous with the end portion of the first substrate, wherein the second metal layer is continuous with the first metal layer;
   a second substrate having a second plasmonic waveguide formed of a third metal layer; and
   a second optical waveguide connected to the second plasmonic waveguide and disposed on the second substrate;
   wherein the second metal layer and the third metal layer are joined together to connect the first substrate to the second substrate; and
   wherein a waveguide direction at the first end of the first plasmonic waveguide located on a side of the end portion of the first substrate coincides with a waveguide direction of the second plasmonic waveguide.

2. The optical module according to claim 1, wherein:
   the first plasmonic waveguide and the first optical waveguide are connected by a mode conversion portion on the first substrate, and
   in the mode conversion portion, a first end of a core of the first optical waveguide is tapered, and the first metal layer at a second end of the first plasmonic waveguide and the first end of the core of the first optical waveguide are arranged at a predetermined interval.

3. The optical module according to claim 1, wherein the third metal layer comprises a tapered portion with a width equal to a width of a core of the second optical waveguide, and wherein the tapered portion of the third metal layer is in a connection portion with the second optical waveguide.

4. The optical module according to claim 1, wherein a surface of the first substrate is vertical to a surface of the second substrate.

5. The optical module according to claim 1, wherein:
   the second substrate has a plurality of pairs of second plasmonic waveguides and second optical waveguides, wherein the second plasmonic waveguide is one of the second plasmonic waveguides, and wherein the second optical waveguide is one of the second optical waveguides;
   the optical module further comprises a number of first substrates corresponding to a number of pairs of the second plasmonic waveguides and the second optical waveguides, wherein the first substrate is one of the first substrates; and
   the first substrates are respectively connected to the plurality of pairs of the second plasmonic waveguides and the second optical waveguides.

6. A method comprising:
   providing a first substrate having a first optical waveguide;
   forming a first plasmonic waveguide comprising:
     a first end formed of a first metal layer over an end portion of the first substrate; and
     a second end connected to a first end of the first optical waveguide;
   forming a second metal layer on a side surface continuous with the end portion of the first substrate, wherein the second metal layer is continuous with the first metal layer;
   forming a second substrate having a second plasmonic waveguide of a third metal layer; and
   connecting a second optical waveguide to the second plasmonic waveguide, wherein the second optical waveguide is disposed on the second substrate;
   wherein the second metal layer and the third metal layer are joined together to connect the first substrate to the second substrate; and
   wherein a waveguide direction at the first end of the first plasmonic waveguide located on a side of the end portion of the first substrate coincides with a waveguide direction of the second plasmonic waveguide.

7. The method according to claim 6, wherein:
   the first plasmonic waveguide and the first optical waveguide are connected by a mode conversion portion on the first substrate, and
   in the mode conversion portion, a first end of a core of the first optical waveguide is tapered, and the first metal layer at a second end of the first plasmonic waveguide and the first end of the core of the first optical waveguide are arranged at a predetermined interval.

8. The method according to claim 6, wherein the third metal layer comprises a tapered portion with a width equal to a width of a core of the second optical waveguide, and wherein the tapered portion of the third metal layer is in a connection portion with the second optical waveguide.

9. The method according to claim 6, wherein a surface of the first substrate is vertical to a surface of the second substrate.

10. The method according to claim 6, wherein:
    the second substrate has a plurality of pairs of second plasmonic waveguides and second optical waveguides, wherein the second plasmonic waveguide is one of the second plasmonic waveguides, and wherein the second optical waveguide is one of the second optical waveguides;
    the method further comprises forming a number of first substrates corresponding to a number of pairs of the second plasmonic waveguides and the second optical waveguides, wherein the first substrate is one of the first substrates; and
    the first substrates are respectively connected to the plurality of pairs of the second plasmonic waveguides and the second optical waveguides.

* * * * *